March 20, 1962 E. F. ENGLES 3,026,273
PROCESS FOR MAKING EXPANDABLE VINYL AROMATIC RESIN COMPOSITIONS
Original Filed Nov. 29, 1957
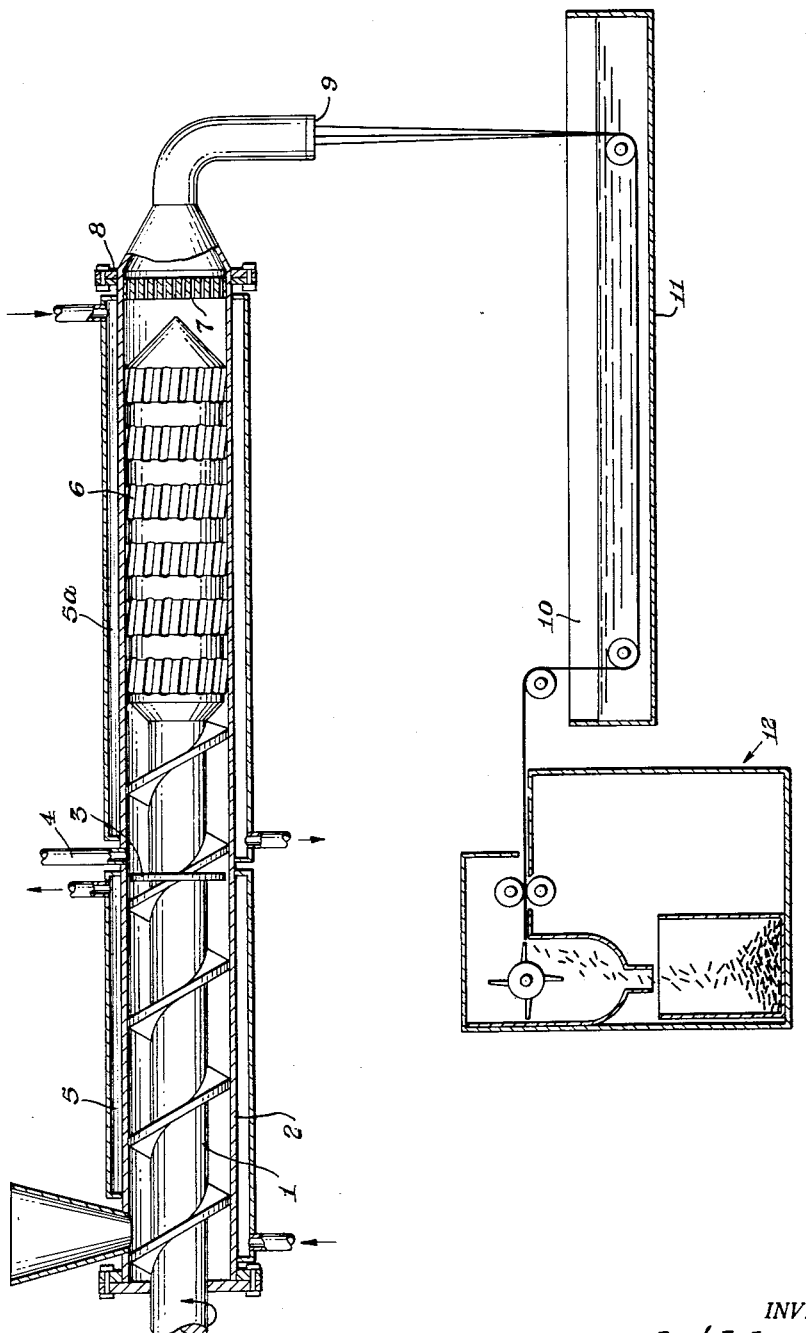
INVENTOR.
Earl F. Engles
BY
Griswold & Burdick
ATTORNEYS United States Patent Office 3,026,273
Patented Mar. 20, 1962

3,026,273
PROCESS FOR MAKING EXPANDABLE VINYL AROMATIC RESIN COMPOSITIONS
Earl F. Engles, Midland, Mich., assignor to The Dow Chemical Company, Midland, Mich., a corporation of Delaware
Continuation of application Ser. No. 699,666, Nov. 29, 1957. This application May 8, 1961, Ser. No. 110,608
11 Claims. (Cl. 260—2.5)

This invention concerns a process for making expandable thermoplastic resin compositions. It relates more particularly to a process for making polymeric compositions comprising essentially a normally solid thermoplastic vinyl aromatic resin having a volatile organic compound uniformly dispersed throughout which compositions are capable of expanding upon heating to form cellular masses.

It is known to make cellular or foamed plastic masses by incorporating a volatile organic liquid or a solid substance which decomposes under the action of heat to form a gas, with a thermoplastic material and thereafter to heat the material at elevated temperatures whereby the gas or vapors of the volatile liquid expand the thermoplastic material to form a cellular or porous mass.

U.S. Patent No. 2,681,321 makes porous plastic masses by incorporating with a thermoplastic polymer a volatile organic liquid in which the polymer is insoluble such as petroleum ether, pentane, hexane, heptane, methyl alcohol, acetone, dipropyl ether and the like, either by soaking or swelling the solid polymer, e.g. polystyrene, in the volatile organic liquid, or by dissolving the volatile organic liquid in the monomer or a mixture of the monomer and polymer and heating the mixture at a temperature below the boiling point of the volatile organic liquid under the conditions employed, to obtain a solid polymeric body containing the volatile liquid dispersed throughout, then heating the solid material to a temperature above its softening point and above the boiling point of the volatile liquid whereby a porous polymer mass is obtained.

The method heretofore proposed for making polymeric compositions suitable for use in the manufacture of porous or cellular plastic masses have not been entirely satisfactory because soaking of the solid polymer in the volatile organic liquid frequently requires maintaining the polymer in contact with the organic liquid for prolonged periods of time in order to obtain a product having the volatile liquid uniformly dispersed throughout. The polymerizing of monomers in admixture with many volatile organic liquids in which the polymer is insoluble or only swellable, increases the problems of manufacture, requires the use of pressure resistant polymerization vessels and in many instances the volatile organic liquid tends to inhibit the polymerization reaction.

It has now been found that expandable thermoplastic resin compositions comprising essentially a thermoplastic vinyl aromatic resin having a volatile organic compound uniformly dispersed throughout can readily be prepared by supplying a mixture of a heat-plastified thermoplastic polymer and a volatile organic compound under super-atmospheric pressure at temperatures between 160° and 280° C. to a mixing and cooling zone, advancing the mixture toward an extrusion orifice or die, cooling and blending the mixture during said advancing to a homogeneously heat-plastified mass at temperatures between 90° and 130° C., extruding the heat plastified mass into a zone of substantially atmospheric pressure and almost immediately contacting the extruded material with an inert liquid cooling medium at a temperature below 50° C. and withdrawing the extruded material from the orifice face.

The invention is described more particularly with reference to the accompanying drawing wherein is shown partly in section one of the various forms of arrangements of apparatus which can be used in practice of the invention. The drawing shows a longitudinal section through the barrel of a plastics extruder having a first heating and pressing section, a second mixing and cooling section, a sealing plate between said first and second sections for preventing counter-current leakage of gas or vapors through the plastics extruder and an extrusion die or orifice for discharging material from the mixing and cooling zone into a zone of substantially atmospheric pressure wherein the extruded material is drawn away from the die face and almost immediately cooled. The cooled material is usually cut or broken to a granular form.

In the drawing, the numeral 1 designates a feed screw of the compression type rotatably mounted in the cylindrical barrel 2 of a horizontal plastics extruder. The screw 1 has a sealing plate 3 which can be a perforated plate or an annular ring, suitably attached to the mid-section and preferably an integral part of the screw. The barrel 2 of the plastics extruder is provided with an inlet 4 positioned beyond the sealing plate 3 for feed of a volatile organic compound into the mixing and cooling section. The barrel 2 is surrounded by chambers 5 and 5a for heating or cooling as required, such heating or cooling being carried out by passage of a heat transfer medium such as steam, air, oil, water or brine through the chambers 5 and 5a via suitable inlets and outlets. The screw 1 is provided with a terminal mixing torpedo 6 suitably of a type similar to that described in U.S. Patent No. 2,453,088. Beyond mixing torpedo 6 in the extrusion path is a screen or strainer 7 held in place across the discharge end of the barrel 2 by head 8 which is secured to the body of the plastics extruder by any suitable means, e.g. bolts. Head 8 can be of any desired form and may be straight or curved as shown. The head 8 provides a continuation of the extrusion path and terminates with an extrusion die 9 containing one or a plurality of constricted passageways for discharging the extruded material. The extruded material is drawn away from the die 9 in the form of one or a plurality of strands or as a ribbon or sheet and is almost immediately contacted with an inert liquid cooling medium 10 in vessel 11 wherein the extruded material is cooled, then is withdrawn and passed to cutting device 12 and cut to a granular form. The material need not be cut to a granular form as cooled, but can be drawn away as a sheet or strands.

In producing a latent-foaming polystyrene composition by the method of the invention, granular polystyrene, suitably having a molecular weight corresponding to a viscosity characteristic of from 15 to 30 centipoises or higher as determined for a 10 weight percent solution of the polystyrene in toluene at 25° C., is fed into the first heating and pressing section of the plastics extruder wherein the polystyrene is heat-plastified or melted, e.g. is pressed and heated to temperatures between 160° and 280° C., and is brought to a plastic flowable condition. The heat-plastified polystyrene is pressed by the flights of screw 1 in the barrel 2 of the extruder and forced through, if perforated, or around sealing plate 3 into the second or mixing and cooling section of the extruder. A volatile organic compound, e.g. petroleum ether, isopentane, dichlorodifluoromethane or the like, in which the polystyrene is substantially insoluble or only swellable is fed to the mixing and cooling section of the extruder via inlet 4 under pressure and in the desired amount into admixture with the heat-plastified polystyrene. The resulting mixture is forwarded and blended by flights of the screw and the terminal mixing torpedo 6 and is brought to a desired temperature, suitably between 90° and 130° C., by passage of a heat transfer medium through chamber 5a and is forced through the strainer 7 into head 8 and discharged through die 9 into a zone of substantially atmospheric pressure. The extruded material is allowed to fall away by gravity or preferably is drawn away at about the rate of extrusion through die 9 or a somewhat greater rate, and is almost immediately contacted with an inert liquid coolant 10, suitably water or brine and cooled to a temperature below 50° C., after which the material is withdrawn from the cooling liquid and passed to cutting device 12 wherein it is cut to a granular form.

Although the invention is particularly described with reference to the making of latent-foaming polystyrene compositions, the process can be applied to any thermoplastic resin and volatile organic compound in which the resin is insoluble or substantially insoluble or which only swells the resin.

More specifically, the process can be employed to make latent-foaming polymeric compositions from the normally solid thermoplastic polymers of one or more monovinyl aromatic compounds of the benzene series, i.e. containing a single vinyl radical directly attached to a carbon atom of said benzene nucleus, such as styrene, vinyltoluene, vinylxylene, ethylvinylbenzene, isopropylstyrene ar-ethylvinyltoluene, di-tert.-butyl styrene or nuclear halogenated derivatives of such monovinyl aromatic hydrocarbons, e.g. chlorostyrene, dichlorostyrene, bromostyrene, or fluorostyrene. Thermoplastic copolymers of from 99.9 to 99.99 percent by weight of any one or more such monovinyl aromatic compounds and from 0.1 to 0.01 percent of a polyvinyl aromatic hydrocarbon such as divinylbenzene, ethyldivinylbenzene, divinyltoluene or divinylxylene can also be used. Other thermoplastic copolymers that can be employed in the process are copolymers of from 70 to 99 percent by weight of one or more monovinyl aromatic compounds and from 30 to 1 percent of an alkenyl aromatic compound such as alpha-methyl styrene, para-methyl-alpha-methyl styrene or alpha-ethyl styrene, or copolymers of from 70 to 99 percent by weight of a monovinyl aromatic compound, e.g. styrene, vinyltoluene, dichlorostyrene and the like, and from 30 to 1 percent of acrylonitrile, methyl methacrylate, acrylic acid or methacrylic acid.

The volatile organic compound to be employed as the foaming agent in the process can be a liquid or gas at ordinary temperatures and pressures, i.e. at atmospheric conditions, and to be best suited for the purpose of the invention is a non-solvent or poor solvent for the polymer and has a boiling point not substantially higher than the softening point of the polymer. Suitable volatile organic compounds are the saturated aliphatic hydrocarbons containing from 4 to 7 carbon atoms in the molecule and perchlorofluorocarbons which compounds have a molecular weight of at least 58 and a boiling point not higher than 95° C. at 760 millimeters absolute pressure. Examples of such volatile organic compounds are butane, n-pentane, isopentane, neopentane, hexanes, heptanes, trichlorofluoromethane, dichlorodifluoromethane, monochlorotrifluoromethane, sym-tetrachlorodifluoroethane, 1,2,2-trichloro-1,1,2-trifluoroethane, sym-dichlorotetrafluoroethane, 1-chloro-1,1,2,2,2-pentafluoroethane, 1-chloro-1,2,2,3,3,4,4-heptafluorocyclobutane and 1,2-dichloro-1,2,3,3,4,4-hexafluorocyclobutane. Mixtures of any two or more of such volatile organic compounds can also be used.

The volatile organic compound can be employed in amounts corresponding to from 0.05 to 0.3, preferably from 0.05 to 0.2, gram molecular proportions of the volatile organic compound per 100 grams of the polymeric material. The volatile organic compound is preferably calculated on a gram molar basis per 100 grams of the polymeric starting material in order to have present in the final composition an amount of the volatile organic compound sufficient to provide an equal or substantially equal volume of vapors for subsequently expanding the polymer to form a cellular mass, regardless of the density of the volatile organic compound employed.

In practice a normally solid thermoplastic material, e.g. polystyrene, a copolymer of from 99.9 to 99.99 percent by weight of styrene and from 0.1 to 0.01 percent of divinylbenzene or a copolymer of from 70 to 99 percent by weight of styrene and from 30 to 1 percent of acrylonitrile, alpha-methyl styrene or methyl methacrylate, is fed to a plastics extruder having a heating and pressing section, a mixing and cooling section, a sealing plate interposed between said sections and inlets for feeding materials to said sections and a constricted discharge passageway or extrusion orifice, similar to the plastics extruder shown in the accompanying drawing. The polymer preferably in granular form is pressed and heated to heat-plastifying temperatures between 160° and 280° C. in the first section of the extruder. The heat-plastified material is forced by means of the feed screw around or through the sealing plate and into the second or mixing and cooling section of the extruder. The flow of the heat-plastified polymer around the sealing plate forms an effective plastic seal against counter-current leakage of gas or vapors through the extruder. A volatile organic liquid, e.g. pentane, dichlorodifluoromethane, neopentane or the like, is fed under pressure to the mixing and cooling section via a suitable inlet and into admixture with the heat-plastified polymer in the desired proportion. The resulting mixture is malaxated under pressure and is cooled to a temperature between 90° and 130° C. to form a homogeneously heat-plastified polymeric composition and is extruded through the die or orifice into a zone of substantially atmospheric pressure. The composition is discharged from the extruder through a die or orifice positioned adjacent to, suitably above, a liquid body of a cooling medium, e.g. brine or water, at temperatures between 0° and 50° C., preferably between 10° and 40° C. The extruded material is suitably drawn away from the die or orifice at about the rate of extrusion through said orifice or at a somewhat faster rate and is almost immediately contacted with the cooling medium, suitably by immersing the extruded material in the liquid coolant or by spraying the cooling liquid on the extruded material, so as to rapidly cool at least the surface of the extruded material to a rigid condition. The extruded material is usually contacted with the liquid cooling medium for a time sufficient to cool the composition throughout substantially to the same temperature as the cooling medium after which the composition is withdrawn and is usually cut or ground to a granular form. The composition is preferably extruded to the form of continuous strands, ribbons or thin sheets which can readily be drawn away from the die and rapidly cooled to a rigid condition and easily cut or broken to a granular form.

Small amounts of additives such as plasticizers, lubricants, dyes, light stabilizing agents, antioxidants, or flameproofing agents can be incorporated with the polymeric compositions. Such additives are usually employed in amounts of from 0.02 to 5 percent by weight or more of the polymer, but such additives are not required in the invention.

The compositions of the invention are transparent or opaque materials and have a density of from about 0.8 to 1.2. Upon heating of the polymeric compositions to the softening temperature of the polymer or above and above the boiling point of the volatile organic compound contained therein, the vapors of the volatile organic compound expand the polymer to form a cellular body or mass. The density of foamed masses prepared from the compositions can be varied from products having a density as low as 0.5 pound per cubic foot of foam to that of the polymeric composition depending in part upon the kind and proportion of the foaming agent and the foaming conditions. By heating granules of the latent-foaming polymeric compositions in a mold which allows escape of the vapors the granules can be foamed and fused together to form a unitary foamed body. By varying the proportion of granules placed in a mold of a given size, shaped foamed masses having any desired density within the above stated range can be obtained.

The following examples illustrate ways in which the principle of the invention has been applied but are not to be construed as limiting its scope.

EXAMPLE 1

Granular polystyrene containing one percent by weight of white mineral oil as lubricant which polystyrene had a viscosity characteristic of 28 centipoises as determined for a 10 weight percent solution of the polystyrene in toluene at 25° C., was fed to a plastics extruder at a rate of 30 pounds per hour. The plastics extruder employed in the experiment comprised a four foot long barrel having a 2½ inch diameter screw equipped with a mixing head 4 inches in diameter by 2 feet long. The mixing head was similar in design to that described in U.S. Patent No. 2,453,088. The screw was fitted with a sealing plate positioned on a mid-section thereof. The extruder had an inlet to the barrel adjacent to the sealing plate on the screw for feed of a volatile organic compound into the extruder. The sealing plate formed a constricted passageway between the melting section and the mixing and cooling section of the extruder so that flow of the molten polystyrene through the constricted passageway between the rim of the sealing plate and the bore of the barrel formed an effective plastic seal against counter-current flow of vapors of the volatile organic material from the mixing and cooling zone of the extruder. The extruder was connected in an arrangement of apparatus similar to that shown in the drawing, wherein the material was forwarded in the mixing and cooling section of the extruder under pressure and malaxated into a homogeneously heat-plastified mass under pressure and brought to a uniform temperature throughout just prior to discharge into the atmosphere through a multiple orifice die. The polystyrene was heat-plastified at temperatures between 170° and 220° C. in the first section of the extruder and was forwarded by pressure of the screw around the sealing plate into the mixing and cooling section of the extruder wherein it was mixed with isopentane fed into the barrel of the extruder under pressure at a rate of 2.38 pounds per hour. The resulting mixture was blended under pressure and cooled to a homogeneously heat-plastified mass and was extruded under a pressure of about 550 pounds per square inch gauge pressure and at a temperature of 131° C. through a die having forty-six ³⁄₆₄ inch diameter drill holes, into the atmosphere. The die was positioned at a distance of about one inch above a liquid body of water maintained at a temperature of 13° C. The strands of the extruded material were drawn downward away from the die and immersed under about 3 inches of water, then passed horizontally through about three feet of water and removed from the cooling bath and passed to a cutting device wherein they were cut to a granular form. The extruded strands in passing downward through air into the water bath were hot stretched so that the cooled strands of product had a diameter of about ¹⁄₃₂ inch. The product was transparent granules of the polystyrene containing the isopentane uniformly dispersed throughout. The granules contained approximately 5.5 percent by weight of the isopentane and had a density of 0.96. A portion of the product was foamed by heating the same at temperatures between 105 and 110° C. for a period of 3 minutes. The foamed material had a volume 24 times as great as the initial volume of the polymeric composition. It was a cellular mass having a density corresponding to 2.6 pounds per cubic foot of the foam.

EXAMPLE 2

In each of a series of experiments a thermoplastic polymer and a volatile organic compound as identified in the following table were malaxated under pressure into a homogeneously heat-plastified mass, extruded into the atmosphere, cooled and ground to a granular form employing an arrangement of apparatus similar to that employed in Example 1. Table I identifies the polymer starting material and the volatile organic compound employed as foaming agent and gives the rate of feed of each to the extruder in pounds per hour. The table also gives the pressure in pounds per square inch gauge pressure of the material in the extruder just prior to discharge through the extrusion orifice, the temperature of the extruding material and the temperature of the water bath which was used to cool the extruded material.

The table gives the percent by weight of the volatile organic compound in the product and its density. Portions of the product were foamed by heating the same with superheated steam at atmospheric pressure and at temperatures between 105° and 110° C. The products foamed to cellular masses. The table gives the ratio of the volume of the foam to the initial volume of the product.

*Table I*

| Run No. | Starting Materials | | | | Extrusion Conditions | | | Product | | |
|---|---|---|---|---|---|---|---|---|---|---|
| | Polymer | | Volatile Compound | | Pressure, lbs./sq. in. | Temp., ° C. | Water Bath Temp., ° C. | Volatile Compound, Percent | Density, gm./cc. | Foam Volume/ Initial Volume Ratio |
| | Kind | lbs./hr. | Kind | lbs./hr. | | | | | | |
| 1 | Polystyrene | 24 | Isopentane | 1.5 | 850 | 114 | 13 | 5.75 | 0.96 | 10 |
| 2 | do | 20 | Dichlorodifluoroethane | 2.75 | 1,000 | 126 | 13 | 12.0 | 1.1 | 5.5 |
| 3 | Polydichloro Styrene | 20 | Isopentane | 1.25 | 600 | 119 | 13 | 5.75 | 0.96 | 9.5 |
| 4 | Polyvinyltoluene | 30 | do | 2.25 | 500 | 117 | 23 | 7.0 | 0.96 | 4.5 |
| 5 | Copolymer of 99.94% Styrene, 0.06% Divinylbenzene. | 20 | do | 2.25 | 875 | 117 | 23 | 10.0 | 0.94 | 4.0 |
| 6 | Polystyrene | 30 | do | 2.0 | 1,000 | 119 | 49 | 6.25 | 0.96 | 3.0 |

EXAMPLE 3

Granular polystyrene having a viscosity characteristic of 22 centipoises (10 weight percent solution of the polystyrene in toluene at 25° C.) was fed to an extruder at a rate of 20 pounds per hour wherein it was heat plastified and mixed with 10 percent by weight of isopentane and 5 percent by weight of acetylene tetrabromide as blowing agent and flame-proofing agent, respectively. The resulting mixture was malaxated under pressure and was extruded as a homogeneously heat-plastified mass under a pressure of about 1200 pounds per square inch gauge pressure and at a temperature of 111° C. into the atmosphere and was almost immediately cooled by being immersed in water at a temperature of 49° C. then was cut to a granular form employing an arrangement of apparatus similar to that shown in the drawing. The product was a solid material having a density of about 1.2 and contained the isopentane and acetylene tetrabromide uniformly dispersed throughout. A portion of the product was foamed by heating in superheated steam at atmospheric pressure and at temperatures between 105° and 109° C. The foamed volume was 19 times as great as the initial volume of the unfoamed material.

By procedure similar to that described in the foregoing examples latent-foaming polymeric compositions can readily be prepared by employing a copolymer of from 70 to 99 percent by weight of styrene and from 30 to 1 percent of alpha-methyl styrene, acrylonitrile or methyl methacrylate for the thermoplastic copolymer employed in the examples.

This application is a continuation of my pending application Serial No. 699,666, filed November 29, 1957, now abandoned.

I claim:

1. A process for making a latent-foaming polymeric composition comprising essentially a normally solid thermoplastic polymer having a volatile organic compound uniformly dispersed throughout, which process comprises supplying a uniform homogeneously heat-plastified mass comprising a normally solid thermoplastic polymer and a volatile organic compound boiling at a temperature not higher than 95° C., and in which the polymer is insoluble in intimate admixture with one another under superatmospheric pressure at temperatures between 160° and 280° C., advancing the heat-plastified mass toward an extrusion orifice, cooling and blending the material during said advancing to a uniform temperature between about 90° C. and a temperature below the heat-plastifying temperature, extruding the heat plastified mass into a zone of atmospheric pressure and almost immediately and prior to appreciable expansion of the extruded material contacting the extruded material with an inert liquid cooling medium and cooling the extruded material to a rigid condition at a temperature below 50° C.

2. A process according to claim 1, wherein the thermoplastic polymer contains in chemically combined form a predominant amount of styrene.

3. A process for making a latent-foaming polymeric composition comprising essentially a normally solid thermoplastic vinyl aromatic polymer having a volatile organic compound uniformly dispersed throughout, which process comprises supplying a uniform homogeneously heat-plastified mass comprising a normally solid thermoplastic vinyl aromatic polymer containing in chemically combined form a predominant amount of at least one monovinyl aromatic compound of the benzene series and a volatile organic compound of the class consisting of saturated aliphatic hydrocarbons and perchlorofluoro carbons having a boiling point not higher than 95° C. and a molecular weight of at least 58, in intimate admixture with one another under superatmospheric pressure and at temperatures between 160° and 280° C., said heat-plastified mass containing the volatile organic compound in proportions corresponding to from 0.05 to 0.3 gram molecular proportion of the volatile organic compound per 100 grams of the vinyl aromatic polymer, advancing the mass toward an extrusion orifice, cooling and blending the material during said advance to a uniform temperature between 90° and 130° C., extruding the heat-plastified mass into a zone of atmospheric pressure and almost immediately and prior to appreciable expansion of the extruded material contacting the extruded material with an inert liquid cooling medium and cooling the extruded material to a rigid condition at a temperature below 50° C., said cooled material having a density between 0.8 and 1.2.

4. A process as claimed in claim 3, wherein the vinyl aromatic polymer is a polymerized monovinyl aromatic hydrocarbon.

5. A process as claimed in claim 4, wherein the vinyl aromatic polymer is polystyrene.

6. A process as claimed in claim 4, wherein the vinyl aromatic polymer is polyvinyltoluene.

7. A process as claimed in claim 3, wherein the volatile organic compound is at least one saturated aliphatic hydrocarbon containing from 4 to 7 carbon atoms in the molecule.

8. A process as claimed in claim 7, wherein the volatile organic compound contains 5 carbon atoms in the molecule.

9. A process as claimed in claim 3, wherein the vinyl aromatic polymer is a copolymer of from 99.9 to 99.99 percent by weight of at least one monovinyl aromatic hydrocarbon and from 0.1 to 0.01 percent of divinylbenzene.

10. A process for making a latent-foaming polymeric composition comprising essentially a normally solid thermoplastic vinyl aromatic polymer having a volatile organic compound in which the vinyl aromatic polymer is substantially insoluble uniformly dispersed throughout, which process comprises supplying under superatmospheric pressure at temperatures between 160° and 280° C., a mixture of (1) a heat-plastified thermoplastic polymeric material of the class consisting of polymerized monovinyl aromatic hydrocarbons of the benzene series, polymerized nuclear halogenated derivatives thereof, copolymers of from 99.90 to 99.99 percent by weight of at least one such monovinyl aromatic compound and from 0.1 to 0.01 percent of a polyvinyl aromatic hydrocarbon and copolymers of from 70 to 99 percent by weight of at least one such monovinyl aromatic compound and from 30 to 1 percent of an alpha-alkyl styrene, and (2) a volatile organic compound of the class consisting of saturated aliphatic hydrocarbons and perchlorofluorocarbons having a molecular weight of at least 58 and boiling at a temperature below 95° C., said mixture containing the volatile organic compound in proportions corresponding to from 0.05 to 0.3 gram molecular proportion of the volatile organic compound per 100 grams of the polymeric material, advancing the mixture toward an extrusion orifice, cooling and blending the mixture during said advancing to a homogeneously heat-plastified mass at temperatures between 90° and 130° C., extruding the heat-plastified mass into a zone of substantially atmospheric pressure and almost immediately and prior to appreciable expansion of the extruded material contacting the extruded material with an inert liquid cooling fluid and cooling the extruded material to a rigid condition at a temperature below 50° C., said cooled material having a density between 0.8 and 1.2.

11. A process for making a latent-foaming polymeric composition comprising essentially a normally solid thermoplastic vinyl aromatic polymer having a volatile organic compound uniformly dispersed throughout, which process comprises supplying a uniform homogeneously heat-plastified mass comprising a normally solid thermoplastic vinyl aromatic polymer containing in chemically combined form a predominant amount of at least one monovinyl aromatic compound of the benzene series and a volatile organic compound of the class consisting of saturated aliphatic hydrocarbons and perchlorofluorocarbons having a boiling point not higher than 95° C. and a molecular weight of at least 58, in intimate admixture with one another under superatmospheric pressure and at temperatures between 160° and 280° C., said heat-plastified mass containing the volatile organic compound in proportions corresponding to from 0.05 to 0.3 gram molecular proportion of the volatile organic compound per 100 grams of the vinyl aromatic polymer, advancing the mass toward an extrusion orifice, cooling and blending the material during said advancing to a uniform temperature between about 90° C. and a temperature below the heat-plastifying temperature, extruding the mixture into a zone of atmospheric pressure and almost immediately and prior to appreciable expansion of the extruded material contacting the extruded material with an inert liquid cooling medium and cooling the extruded material to a rigid condition.

References Cited in the file of this patent

UNITED STATES PATENTS

| | | |
|---|---|---|
| 2,464,746 | Gering | Mar. 15, 1949 |
| 2,515,250 | McIntire | July 18, 1950 |
| 2,537,977 | Dulmage | Jan. 16, 1951 |